(12) United States Patent
Sari

(10) Patent No.: US 6,434,131 B1
(45) Date of Patent: Aug. 13, 2002

(54) CDMA METHOD WITH INCREASED CAPACITY

(75) Inventor: Hikmet Sari, Creteil (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/339,232

(22) Filed: Jun. 24, 1999

(30) Foreign Application Priority Data

Apr. 19, 1909 (EP) ............................................. 99440085

(51) Int. Cl.$^7$ ............................................. H04B 7/216
(52) U.S. Cl. ...................... 370/335; 370/342; 370/208; 370/411
(58) Field of Search ................................. 370/320, 335, 370/342, 411, 208, 209; 375/130, 142, 150

(56) References Cited

U.S. PATENT DOCUMENTS

| | | | | |
|---|---|---|---|---|
| 5,619,526 A | * | 4/1997 | Kim et al. ................... | 370/335 |
| 5,850,394 A | * | 12/1998 | Sekine et al. ............... | 370/342 |
| 5,881,056 A | * | 3/1999 | Huang et al. ............... | 370/335 |
| 6,192,068 B1 | * | 2/2001 | Fattouche et al. .......... | 375/130 |
| 6,292,476 B1 | * | 9/2001 | Zehavi et al. ............... | 370/335 |

FOREIGN PATENT DOCUMENTS

WO    WO 96/27250    9/1996

OTHER PUBLICATIONS

Zhu J, et al.: "Performance of Spread Spectrum Synchronous Access Communication System by Orthogonal Sequences" Electronics and communications in Japan, Part 1 (Communication), Oct. 1986, USA, vol. 69, No. 10, pp. 75–84, XP002116072 ISSN: 8756–6621.

* cited by examiner

*Primary Examiner*—Vivian Chin
*Assistant Examiner*—John J. Lee
(74) *Attorney, Agent, or Firm*—Sughrue Mion, PLLC

(57) ABSTRACT

Using CDMA encoding and spectrum spreading with a factor N, more than N messages are transmitted although N is a theoretical limit for this type of encoding. Encoding uses orthogonal sequences for a first group of N messages and random or pseudo-random sequences PN for a second group of M-N additional messages. On reception, the N messages of the first group are decoded and detected. Their interference is subtracted from the second group of M-N messages before detecting the M-N messages. In a second iteration, the interference of the M-N messages using PN sequences is estimated and subtracted from the N first messages before a second detection on the first group of N messages. Detection is then repeated for the second group of M-N messages after subtracting the interference of the first group of N messages and the mutual interference of the M-N messages.

5 Claims, 2 Drawing Sheets

CDMA METHOD WITH INCREASED CAPACITY

BACKGROUND OF THE INVENTION

The present invention concerns a CDMA (Code Division Multiple Access) method with increased capacity. In practice the invention concerns a method of transmitting a plurality of signals by radio using a spectrum spreading technique in which each symbol to be transmitted is encoded by orthogonal sequences of bits (O sequences) or random or pseudo-random sequences of bits (PN (pseudo-noise) sequences). The decoding carried out at the receiving end is a function of the encoding. The aim of the invention is to increase the number of messages that can be transmitted using a method of the above kind, in particular beyond its known theoretical limit.

Generally speaking, in the case of transmitting a signal for a single user using a given modulation technique (amplitude, frequency, or phase modulation, or a hybrid QAM or other type of modulation), a bandwidth of W is occupied to transmit a bit rate of R. If N users wish to transmit simultaneously in the same manner and at the same bit rate R, the bandwidth occupied is N×W. This is obviously true for FDMA (Frequency Division Multiple Access) encoding. It is also true for TDMA (Time Division Multiple Access) transmission.

In order to describe the basic CDMA technique in more detail, and in a comparable manner, a spectrum spreading factor N is also chosen. N can take any value and a power of 2 is often chosen. In CDMA encoding, a binary symbol (+1 or −1) to be transmitted is encoded by N bits (+1 or −1) of an encoding sequence. Thus encoding is similar to multiplication. The symbols thus encoded N times (N "chips") are transmitted during a symbol period. This also occupies a bandwidth of N×W.

For spectrum spreading resulting from this multiplication, N (and only N) orthogonal sequences can be allocated to N users. In principle, because they are orthogonal, the sequences do not interfere with each other. If there are more than N users the orthogonal CDMA technique cannot be used. In particular, it follows from the orthogonal nature of the encoding sequences that the content of a message of one user does not interfere at all with the content of a message of another user. This is denoted I/S=0, where I represents the interfering energy due to messages different from a message to be transmitted and S represents the energy of the message to be transmitted.

However, in CDMA encoding, it is possible to encode the symbols of messages to be transmitted using random or pseudo-random sequences of N bits rather than orthogonal sequences. In this case, very long random or pseudo-random series of bits (+1 −1) are preferably used (several million bits, for example). Successive and contiguous sections of N sampled bits from the series constitute the encoding sequences. With this kind of random or pseudo-random encoding, a symbol to be transmitted is encoded using a sequence of the above kind, a subsequent symbol is encoded using a subsequent sequence (a subsequent section of N bits from the series of random or pseudo-random bits), and so on.

Although there is no interference with orthogonal sequences of N bits, it can be shown that, because the random or pseudo-random sequences are not orthogonal (or at least no systematically orthogonal), the interference in each message from the channel is of the type K/N where K is the number of users, the number of messages to be transmitted. Because transmission quality is progressively degraded as a function of the number of messages to be transmitted simultaneously, PN CDMA transmission leads to a limit very much lower than N on the number of simultaneous messages that is feasible (for an encoding sequence of N random or pseudo-random bits), because if that number became equal to N, the ratio K/N would become equal to 1: the interference noise would have the same power level as the wanted signal.

The demand for transmission bit rates is ever increasing and as a result the problem of transmission channel saturation is routinely encountered.

SUMMARY OF THE INVENTION

The invention remedies the problem of this limit of messages if the encoding sequences are N bits long. or N first messages the invention uses orthogonal encoding sequences of N bits. This is easy if the number of messages is less than or equal to N. For additional messages, random or pseudo-random (PN) encoding sequences are used that interfere with each other and with the orthogonal sequences. The reception process preferably involves a number of steps. The message signals encoded using orthogonal sequences and those using PN sequences are separated by separate decoding. The proposed multiple access technique can thus accommodate N users without any mutual interference, or a greater number of users at the cost of a slightly degraded signal to noise ratio. However, as shown in the remainder of the description, the effects of such noise can be neutralized by channel encoding methods already in use which provide transmission redundancy. It is then as if M users could together use a channel theoretically limited to N users, when M is greater than N (in one example, M can be in the order of N plus 25% of N).

The invention therefore consists in a spread spectrum transmission method, in particular of the CDMA type, for transmitting a plurality of messages each containing a series of symbols, in which method:

each symbol to be transmitted is encoded using a sequence of N bits to obtain for each symbol a sequence of N contributions known as chips, the chips of the various messages are combined to obtain a transmitted signal, and the transmitted signal is received, characterized in that:

if N symbols at most are transmitted simultaneously, orthogonal sequences are chosen for the sequences of bits used, if M symbols are transmitted simultaneously, where M is greater than N, N orthogonal sequences of N bits are chosen for N symbols and random or pseudo-random sequences of N bits are chosen for the remaining M-N symbols, a sequence of N bits being random or pseudo-random if for subsequent symbols of the same message to be transmitted the sequences of N bits are reproduced only with a period greater than N.

For reception, the method of the invention is characterized in that the following steps are executed:

a) the transmitted signal received is decoded using the N orthogonal sequences and N quantified decoded signals are obtained, the N quantified decoded signals are detected and N estimates of the symbols of the N messages are obtained, b) the transmitted signal received is decoded using the M-N random or pseudo-random additional sequences and M-N quantified decoded additional signals are obtained, c) interference synthesized from the N estimates of the symbols of the N messages is subtracted from each of the M-N quantified decoded additional signals, the results of the subtractions are detected and M-N additional estimates of the symbols of the M-N messages are obtained.

BRIEF DESCRIPTION OF THE DRAWINGS

The invention will be better understood on reading the following description and examining the accompanying drawings. The drawings are given by way of illustrative and non-limiting example of the invention only. In the drawings.

DETAILED DESCRIPTION OF THE INVENTION

Figure 1:
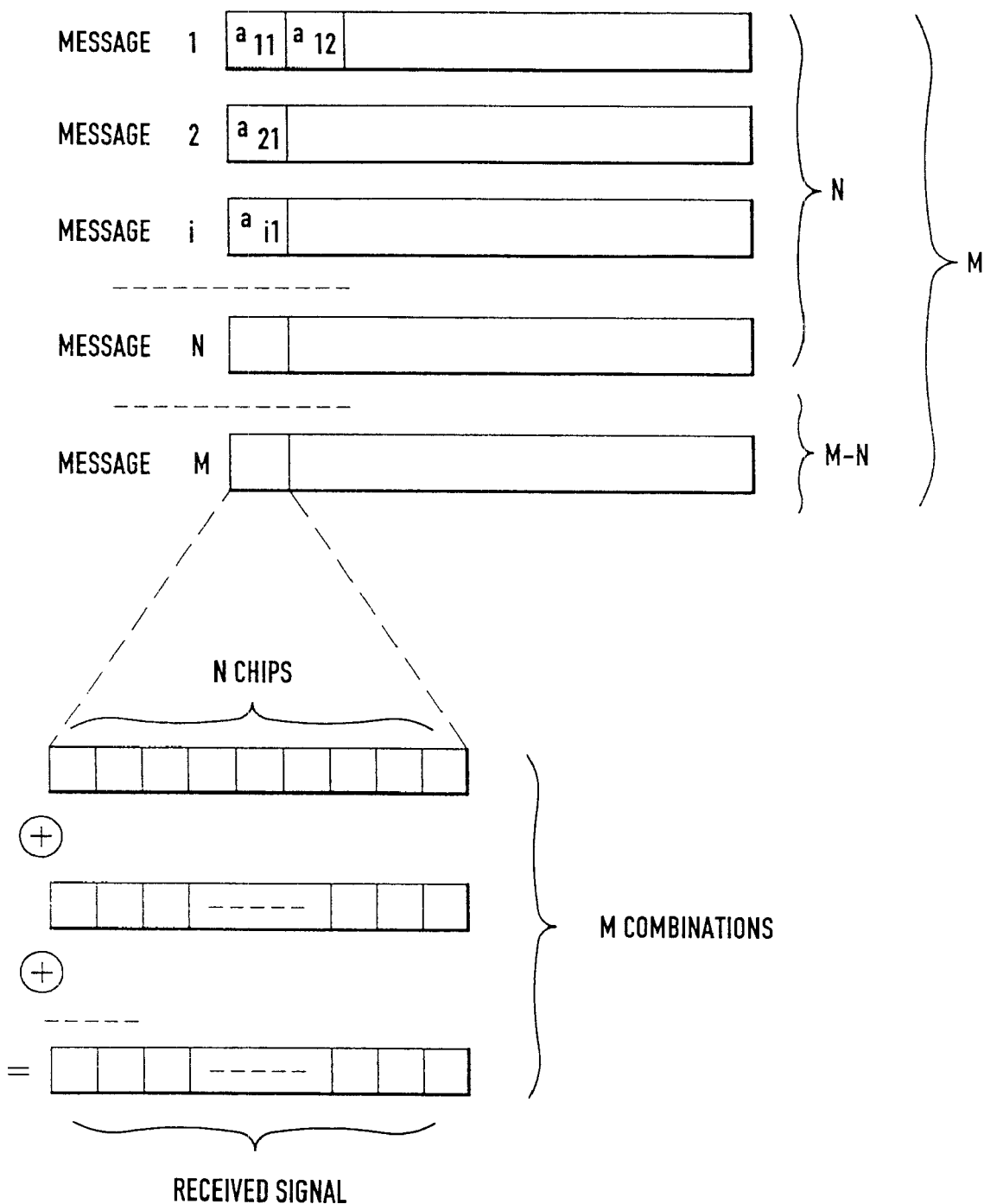
FIG. 1 is a block diagram of the method of the invention.

FIG. 1 shows processing in accordance with the invention of symbols of M messages received simultaneously in a receiver. The invention concerns a CDMA system with a spreading factor equal to N, i.e. with a number of chips per signal equal to N (N is less than M). There are two classes of CDMA encoding: orthogonal CDMA encoding (O-CDMA) and CDMA encoding using pseudo-random sequences (PN-CDMA). In O-CDMA encoding the spreading sequences are orthogonal and there is no mutual interference between users. However, with a spreading factor N the number of sequences is limited to N. In PN-CDMA encoding there is virtually no limit on the number of sequences but mutual interference occurs as soon as there are two users on the same channel. It is therefore not the number of sequences that limits the number of users, but rather the interference, which increases in a linear manner with the number of users. To be more precise, the power of interference between two users with PN-CDMA sequences and with a spreading factor N is 1/N if the power of the signal is normalized at 1. With N users, the interference level will therefore be as high as the signal level, which is clearly unacceptable. The invention combines the respective advantages of orthogonal sequences and PN sequences. In accordance with the invention, with up to N users on the channel, only orthogonal sequences are used, to avoid any interference between users. With more than N users, PN sequences are used (sequences of the greatest possible length, Gold sequences, Kasami sequences or any other type of pseudo-random sequence) to accommodate the additional users.

Hereinafter, $W_1, W_2, \ldots, W_N$ designate the N orthogonal sequences (Walsh-Hadamard sequences) of length N. By definition:

$$W_1 = (W_{1,1}, W_{1,2}, \ldots, W_{3,N})$$
$$W_2 = (W_{2,1}, W_{1,2}, \ldots, W_{2,N})$$
$$W_N = (W_{N,1}, W_{N,2}, \ldots, W_{N,N}) \quad (1)$$

In other words, $w_{i,j}$ designates the $j_{th}$ encoding bit of the sequence $W_i$. Chips are obtained if a symbol $a_{ij}$ of a message Message i is encoded using the sequence $W_i$. In a transmitter, for example that of a mobile telephone, a carrier is modulated by these chips in accordance with a modulation technique (the QAM technique, for example, although any other type of modulation is feasible). The modulated carrier is transmitted by radio and the radio excitation transmitted propagates to a base station of a network of base stations. In a CDMA type system the various transmitters, and thus the various mobile telephones in this instance, are commanded by the base station so that all the same-number chips arrive at the base station at the same time. In this way the modulation chips received for the various messages are combined (additively) with each other. The expression "received signal" means the result of these combinations of chips as received by the base station. This type of encoding can be carried out until the number of messages to be transmitted becomes equal to N.

In accordance with the invention, PN sequences $P_1$, $P_2, \ldots$ are used when the N orthogonal sequences have already been used. As previously indicated, sequences of N encoding bits are constituted:

$$P_1 = (p_{1,1}, p_{1,2}, \ldots, p_{1,N})$$
$$P_2 = (p_{2,1}, p_{2,2}, \ldots, p_{2,N}) \quad (2)$$

etc.

Note that the orthogonal sequences repeat from one symbol $a_{11}$ to another $a_{12}$ because the length of the encoding sequence is exactly the same as the length of the symbol. In contrast, there is no correlation between the PN sequences for two successive symbols. The reason for this is that the sequences given by equation (2) are portions of length N of very long sequences, between two successive portions of which there is consequently no correlation. However, to simplify the description, the time index is omitted from equation (2).

Figure 2:
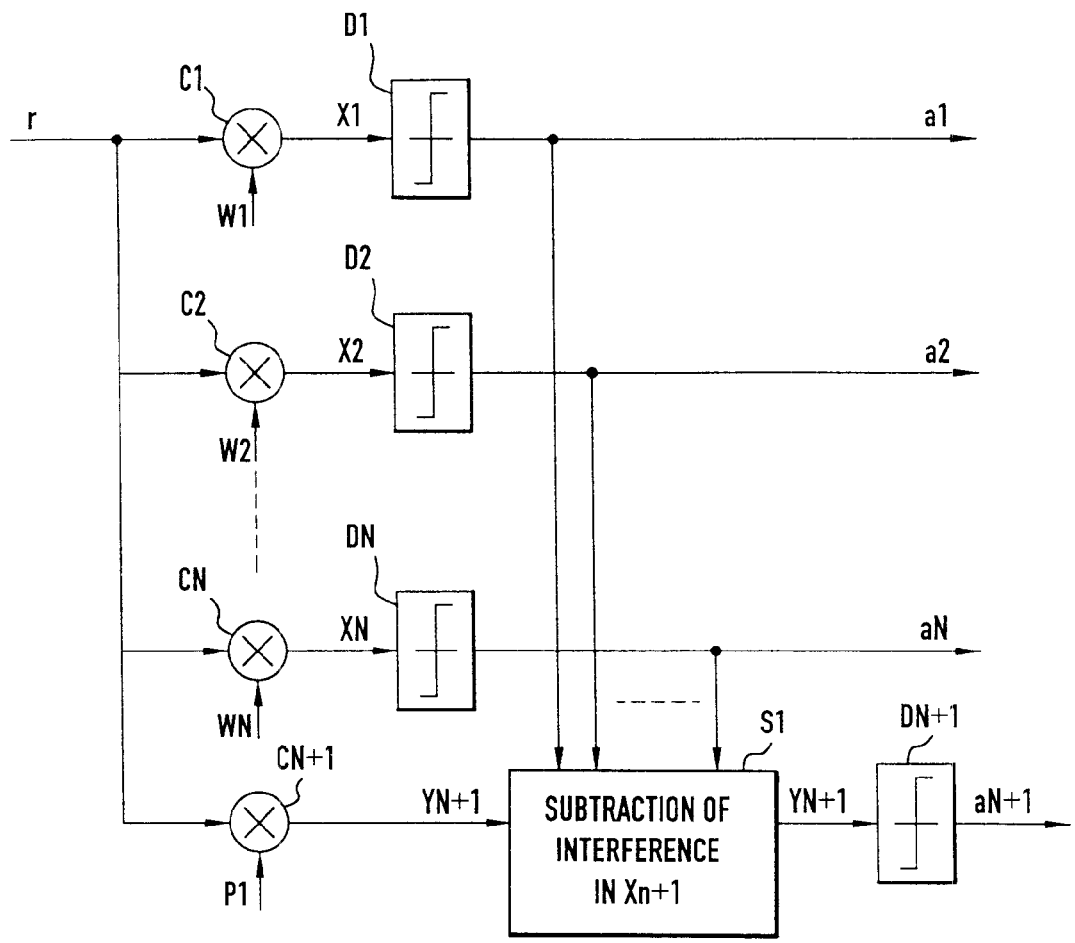
FIG. 2 illustrates a first detection technique.

Several detection techniques can be used for receiving. FIG. 2 shows a first detection technique and concerns a system in accordance with the invention with N+1 users. N users therefore have a Walsh-Hadamard orthogonal sequence and one user has a PN sequence. On reception, the received signal r (the time index is not used because the detection described below does not use information about previous symbols) is sent to a bank of N+1 correlators C1 to CN+1. These correlators establish a correlation between the bits of the received signal and the sequences of bits $W_1$ through $W_N$ and P1 concerning the various symbols. The correlators produce quantified decoded (decorrelated) signals. In one example they are quantified on approximately 12 bits.

The first N users do not suffer any mutual interference. The only interference for these users is that caused by adding additional signals with PN type spreading sequences. Here they are subject only to interference of power 1/N from message N+1. In the present situation, S/I=N. Consequently, the decorrelated signals at the output of the correlators C1 to CN can be fed to threshold detectors D1 to DN without significantly degrading their signal to noise ratio. This decorrelation and this detection constitute a first step.

In contrast, the signal from the (N+1) th user suffers interference of power 1/N from each of the other N users, which means that the S/I ratio is equal to 1 for that user. Thus this signal cannot normally be detected by a threshold detector DN+1. As preliminary decisions are available for the first set of users (obtained in the first step), they can be used to synthesize and subtract their interference on the second set of users. Using the invention, the estimated interference for the N users is preferably subtracted in a second step. This appears in the last branch of FIG. 2 for the $(N+1)^{th}$ user.

Consider the elimination of interference from the first user in FIG. 2 in more detail; the interference of the latter on user N+1 is:

$$I_{I,N+1} = a_I \sum_{i=1}^{N} (p_{I,i} \times w_{I,i})$$

$$= a_1 P_1^T W_1$$

where a1 is the contribution (unwanted here) of the symbol $a_{11}$ and the exponent T means "transposed". Since the sequences P1 and W1 are known to the receiver, the interference $1_{1, N+1}$ can be synthesized and subtracted when a decision has been taken as to the value of $a_{11}$. The same applies to interference from each of the other N−1 users. Generally:

$$I_{n,N+1} = a_n \sum_{i=1}^{N} (p_{I,i} \times w_{n,i})$$

$$= a_n P_1^T W_n$$

for the interference of an $n^{th}$ user (n=1, 2, ..., N) on a N+1$^{th}$ user. Accordingly, the interference subtraction stage S1 shown in FIG. 2 performs the operation:

$$Y_{N+1} = X_{N+1} - \sum_{n=1}^{N} (\hat{a}_n p_1^T W_n)$$

in which â represents the estimated decisions taken for the symbols a and the summation represents the combination of the interference caused by each of the first N symbols. A quantified decoded additional signal applied the input of the subtractor S1 results from decoding the received signal r using the sequence P1. A subtracted additional quantified decoding signal is obtained at the output of the subtractor S1. This signal is detected by a detector DN+1 of the same type as the detectors D1 to DN. If the decisions for the first N symbols are correct, in other words if â=$a_n$ for n =1, 2, ..., N, the interference is totally removed from user signal N+1. This detection technique operates in stages, because the decision on user signal N+1 is taken in a second time period, once the decisions have been effected in parallel for the symbols of users 1 to N, and the latter are used to synthesize and subtract the interference.

The signals with PN spreading sequences suffer at the same time interference from the signals with WH sequences and their mutual interference. The interference they suffer therefore increases with their number. Generally, if the number M−N of additional signals remains small compared to N (for example, less than 10% of N), relatively reliable decisions can be taken on the symbols sent by the WH users from the quantified decoded signals. To be more precise, with M−N users of PN sequences, S/I=N/(M−1), which can be very close to the ratio S/I of the first set of users for M not very different from N.

Figure 3:
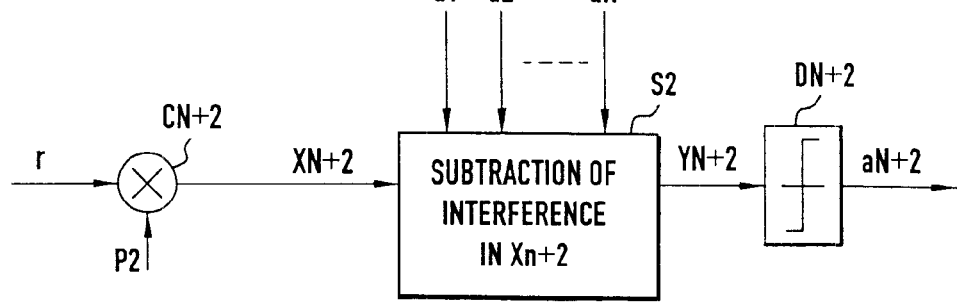
FIG. 3 shows a generalization of the first technique.

The FIG. 2 diagram is therefore easy to generalize in this case to N+2 users, then to N+3 users, and so on by adding branches at the bottom of FIG. 2. The branch for user N+2 is of the form shown in FIG. 3, for example. The interference subtraction box S2 performs the following operation in this situation:

$$Y_{N+2} = X_{N+2} - \sum_{n=1}^{N} (\hat{a}_n p_2^T W_n)$$

Moreover, simulations show that even with a decision error rate of $10^{-3}$, the subtraction of interference is quasi perfect and afterwards the signals of PN sequence users suffer only their mutual interference. This is of the same order of magnitude as that affecting the first set of users in step 1.

These two steps are satisfactory if N is close to M. However, as the aim is to make the number M−N as high as possible, the reliability of the decisions in these first two steps may be insufficient and these decisions may not be regarded as final decisions. For example, for M−N=N/4, the ratio S/I for the signals of users of WH sequences is only 6 dB, which gives a probability of error in the order of $10^{-3}$. In some cases, this is not satisfactory. For such signals a second decoding and detection technique is then used.

This second decoding and detection technique includes iterations. A second iteration of the decisions is preferable for obtaining a sufficiently low probability of error. In this second iteration, in a first step, preliminary decisions on the signals of the second set of users (those with PN sequences) obtained in the second step of a first iteration are used to synthesize the interference of the latter on the signals of the first set of users (those using WH sequences). They are then subtracted in the same fashion as the subtractions shown in FIGS. 2 and 3.

Also, after executing the two steps discussed above in a first iteration, in a second iteration the decisions on $a_1$, $a_2$, ..., $a_N$ are estimated again, once an estimated decision has been taken on the symbols $a_{N+1}$ through $a_M$, in order to increase the reliability of the decisions and to reduce the error rate. In accordance with the invention, once the decisions $a_{N+1}$ through $a_M$ have been estimated, their interference $a_{N+1}P^T_1 W_3$, $a_{N+2}P^T_2 W_5$, ..., $a_M P^T_{M-N} W_3$, on the $n^{th}$ (n=1, 2, ..., N) user can be subtracted before the quantified decoded signal of the latter enters the threshold detector. The decoding technique then becomes iterative.

After such subtractions, new decisions are taken as to the symbols sent by users of WH sequences. The decisions being taken with virtually no interference in this step, the probability of error is extremely small.

In a subsequent second step of this second iteration, the decisions of the first step of the second (or first) iteration and those of the second step of the first iteration are used to subtract all the interference in the signals of users using PN sequences. After this subtraction operation there is virtually no residual interference and the probability of error is also low for this set of users, whose signals can easily be decoded using PN sequences. For the M−N signals using PN sequences, detection follows subtraction of the interference of the N signals using WH sequences and that of the M−N−1 signals using PN sequences.

In principle, it could still be possible to improve the quality of the decisions by further iterations.

However, theoretical analysis and simulations show the improvement is slight beyond the second iteration and that two iterations may be perfectly adequate.

Normally, for a message encoded using an orthogonal sequence, the same orthogonal sequence is used for all successive symbols of the message. With the invention, it is possible for the $R^{th}$ through $(R+1)^{th}$ symbols to permutate encoding between messages encoded using initial PN sequences and orthogonal sequences. Accordingly, a random sequence is defined as a sequence in which the bits used are not reproduced as such with a long sequence period, for example greater than N at least.

Rather than applying the subtractions to the decoded chip signals, it is feasible to re-encode the estimates and to deduce the result from their re-encoding of the received signal. However, the processing required would be unnecessarily voluminous.

What is claimed is:

1. A spread spectrum transmission method, in particular of the CDMA type, for transmitting a plurality of messages each containing a series of symbols, in which method:

each symbol to be transmitted is encoded using a sequence of N bits to obtain for each symbol a sequence of N contributions-known as chips, the chips of the various messages are combined to obtain a transmitted signal, the transmitted signal is received, characterized in that:

if N symbols at most are transmitted simultaneously, orthogonal sequences are chosen for the sequences of bits used, if M symbols are transmitted simultaneously, where M is greater than N, N orthogonal sequences of N bits are chosen for N symbols and random or pseudo-random sequences of N bits are chosen for the M-N remaining symbols, a sequence of N bits being random or pseudo-random if for subsequent symbols of the same message to be transmitted the sequences of N bits are reproduced only with a period greater than N.

2. A method according to claim 1, characterized in that the following steps are executed:

a) the transmitted signal received is decoded using the N orthogonal sequences and N quantified decoded signals (X1) are obtained, the N quantified decoded signals are detected and N estimates ($\hat{a}_1$) of the symbols of the N messages are obtained, b) the transmitted signal received is decoded using the M-N random or pseudo-random additional sequences and M-N quantified decoded additional signals (XN+1, XN+2, . . . ) are obtained, c) interference synthesized from the N estimates of the symbols of the N messages is subtracted from each of the M-N quantified decoded additional signals, the results (YN+1) of the subtractions are detected and M-N additional estimates ($\hat{a}_{N+1}$) of the symbols of the M-N messages are obtained.

3. A method according to claim 2, characterized in that:

f) interference synthesized from the M-N additional estimates ($\hat{a}_{N+1}$) of the symbols of the M-N messages are subtracted from each of the N quantified decoded signals (X1) and the N resulting subtracted quantified decoded signals are detected and N second estimates ($\hat{a}_1$) of the symbols of the N messages are obtained, e) step c) is reiterated, replacing the N estimates of the symbols of the N messages by the N second estimates of the symbols of the N messages.

4. A method according to claim 3, characterized in that, in step e), M-N-1 mutual interferences synthesized from the M-N-1 estimates of the symbols of the M-N-1 other messages are subtracted from each of the M-N quantified decoded additional signals and the results of such subtractions are detected.

5. A method according to claim 1, characterized in that, from the $R^{th}$ symbol of the M messages to the $(R+1)^{th}$ symbol of the M messages, encoding of the messages using orthogonal sequences is replaced by encoding using random or pseudo-random sequences.

\* \* \* \* \*